June 14, 1932. T. C. PROUTY ET AL 1,862,548
METHOD OF AND TUNNEL KILN FOR THE TREATMENT OF CERAMIC WARE
Filed March 24, 1927  7 Sheets-Sheet 1
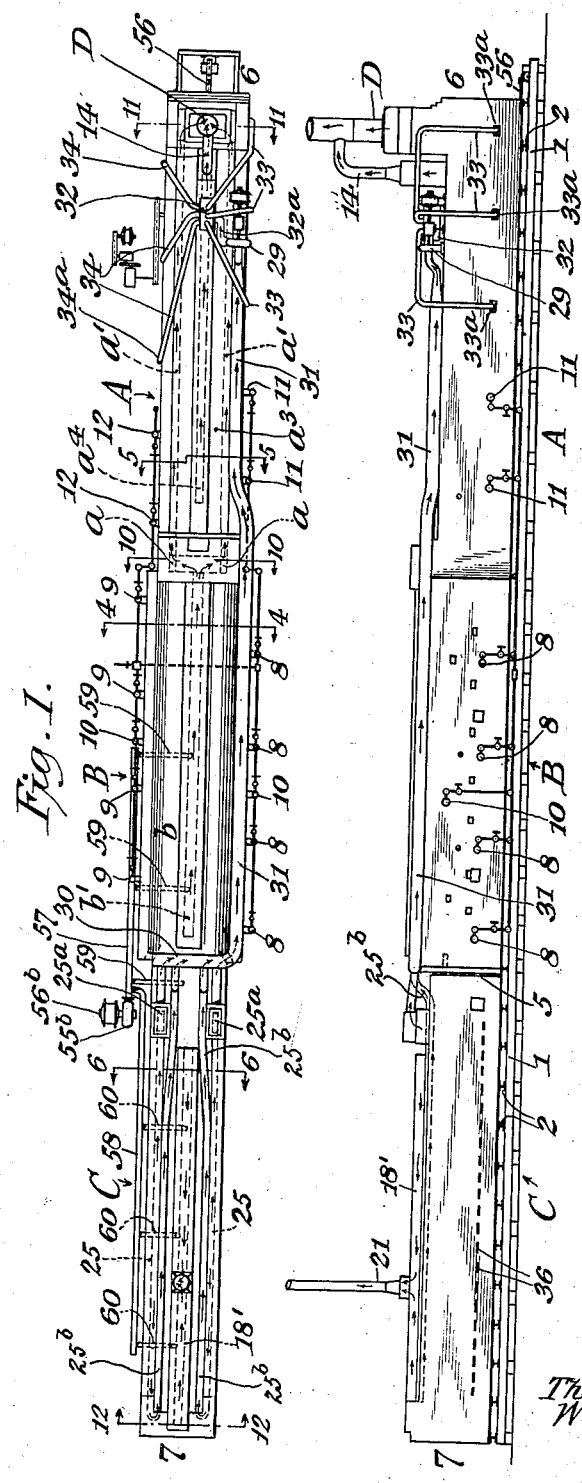
INVENTORS,
Theodore C. Prouty
Willis O. Prouty,
BY
ATTORNEY June 14, 1932.  T. C. PROUTY ET AL  1,862,548
METHOD OF AND TUNNEL KILN FOR THE TREATMENT OF CERAMIC WARE
Filed March 24, 1927  7 Sheets-Sheet 2
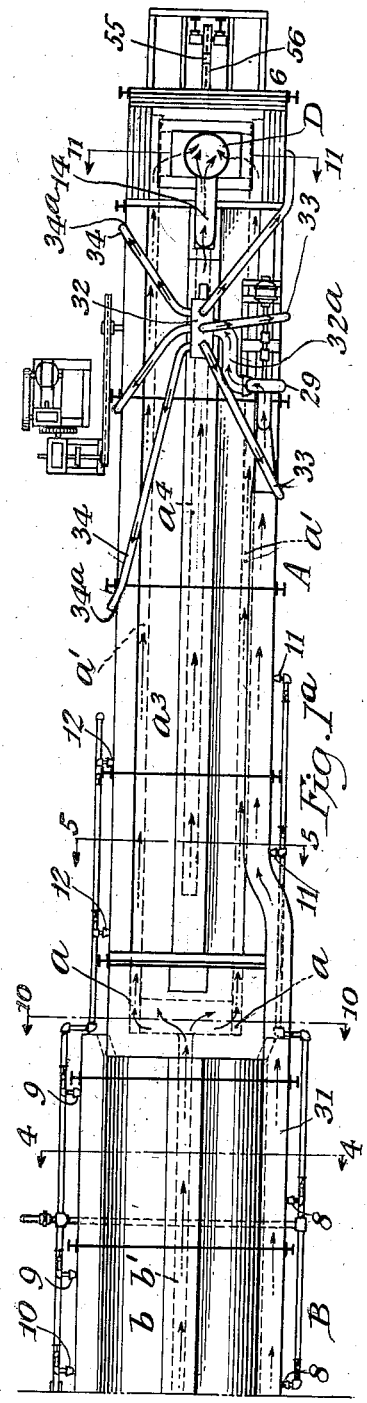
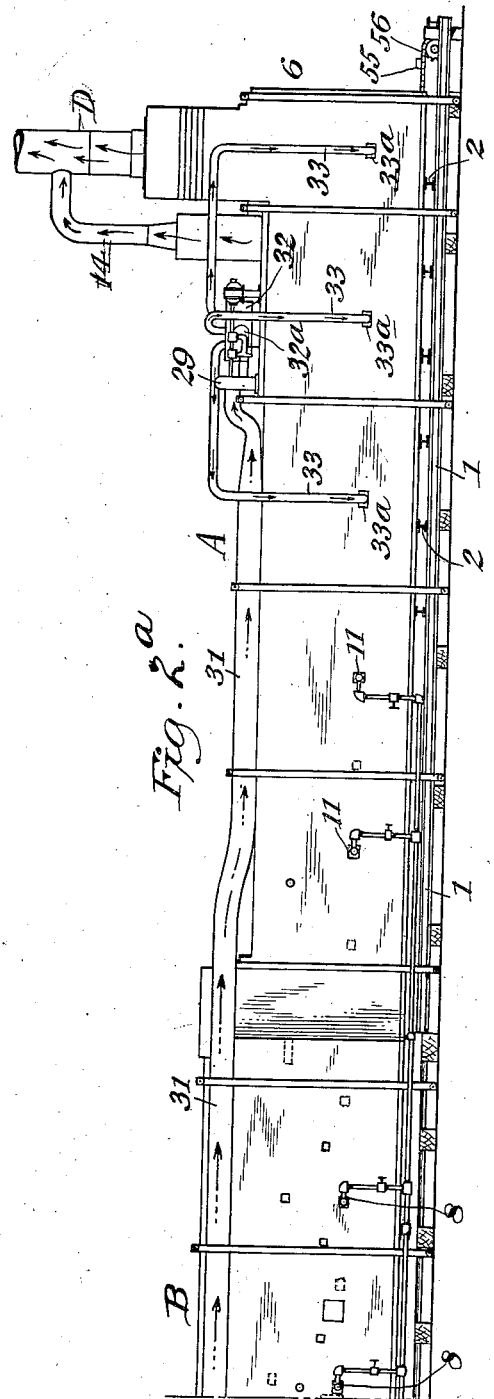
INVENTORS.
Theodore C. Prouty
and Willis O. Prouty,
BY
ATTORNEY.

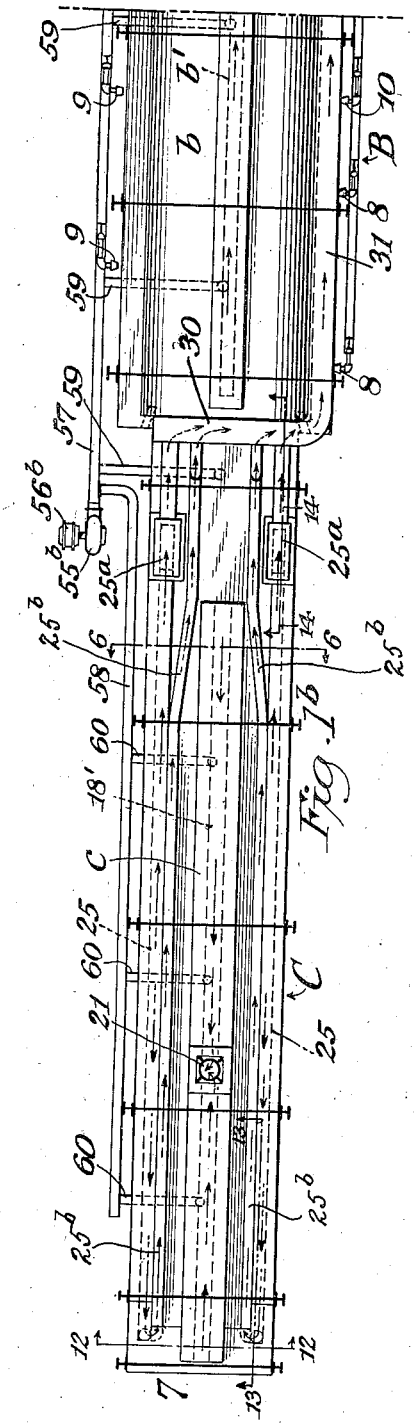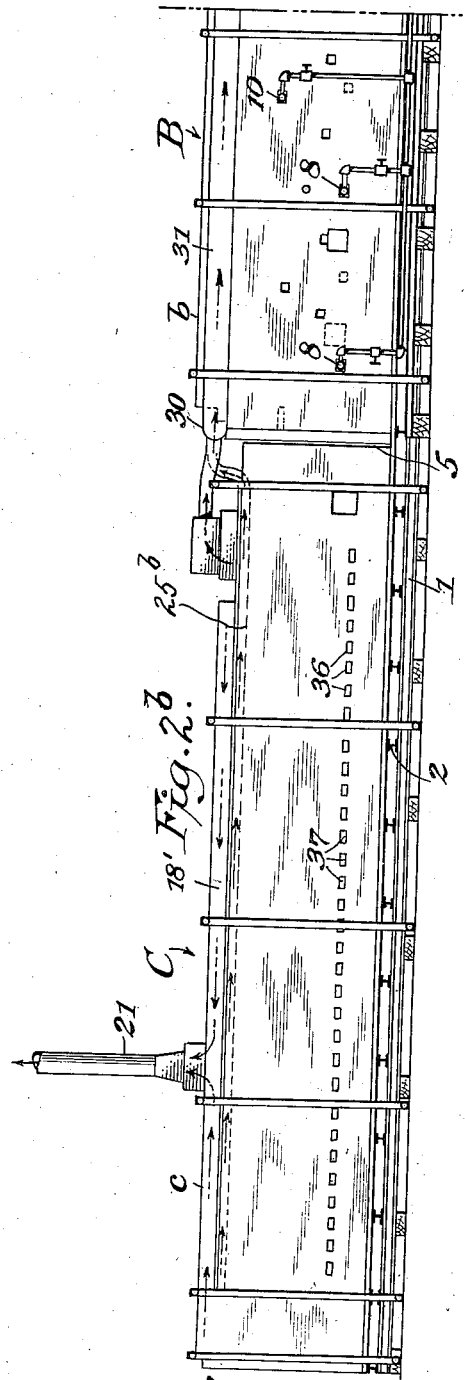

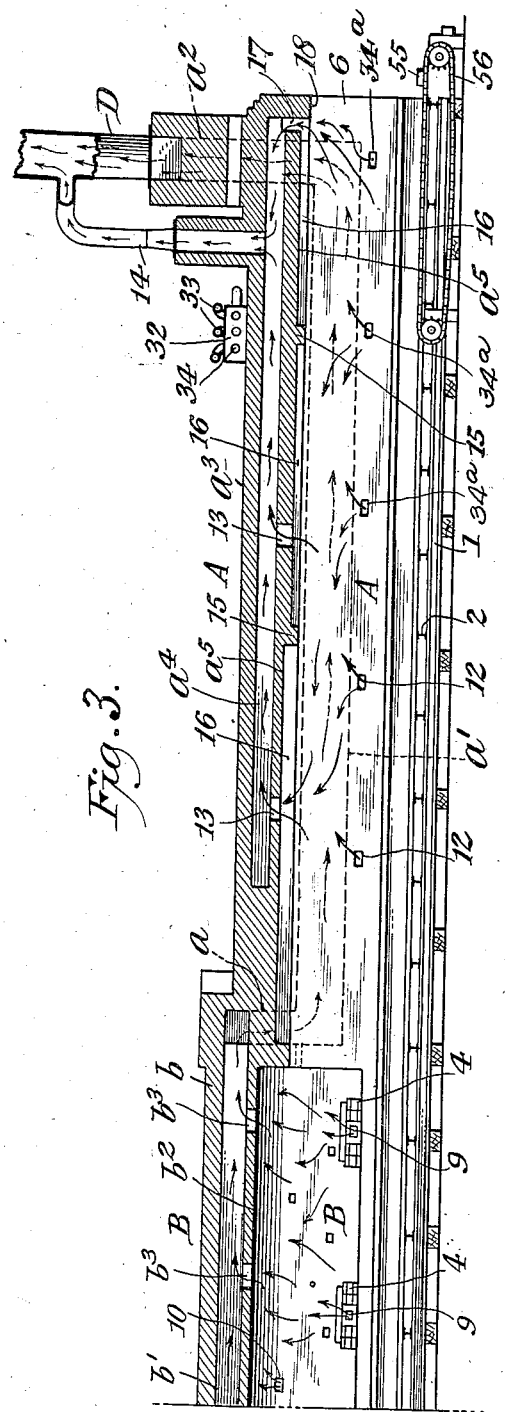

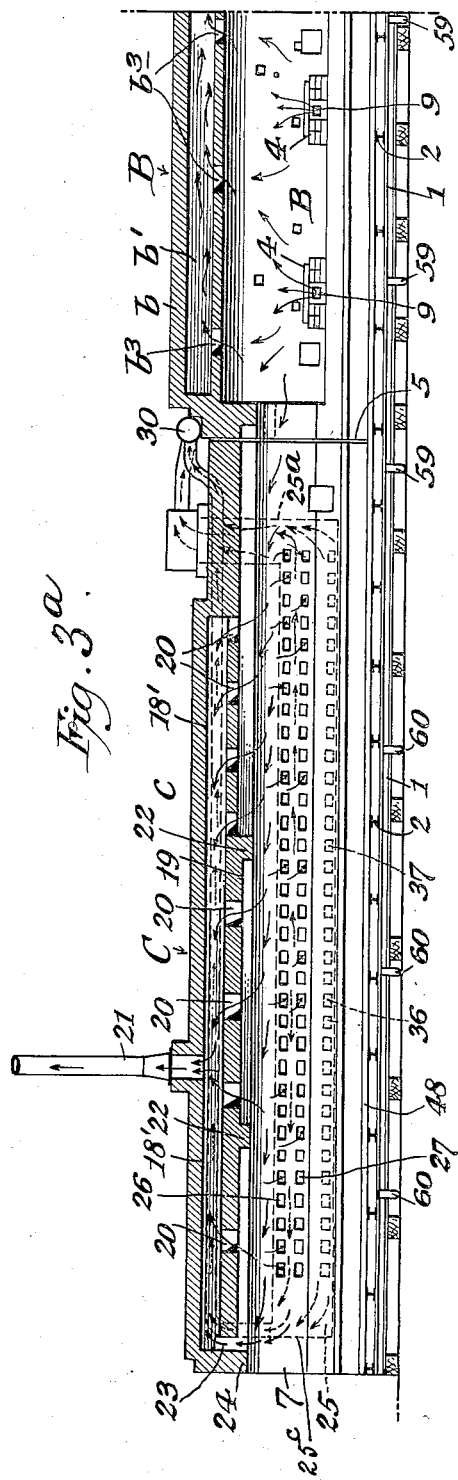
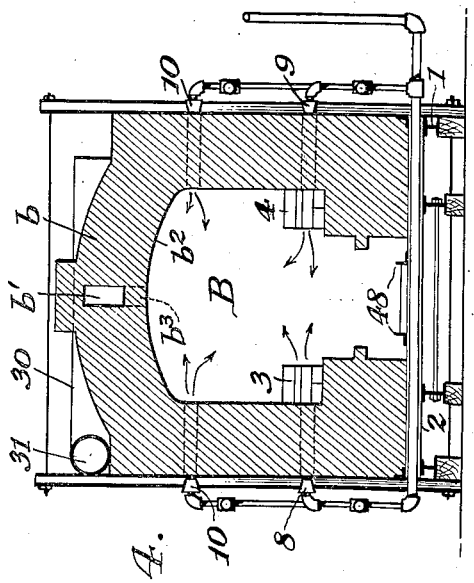

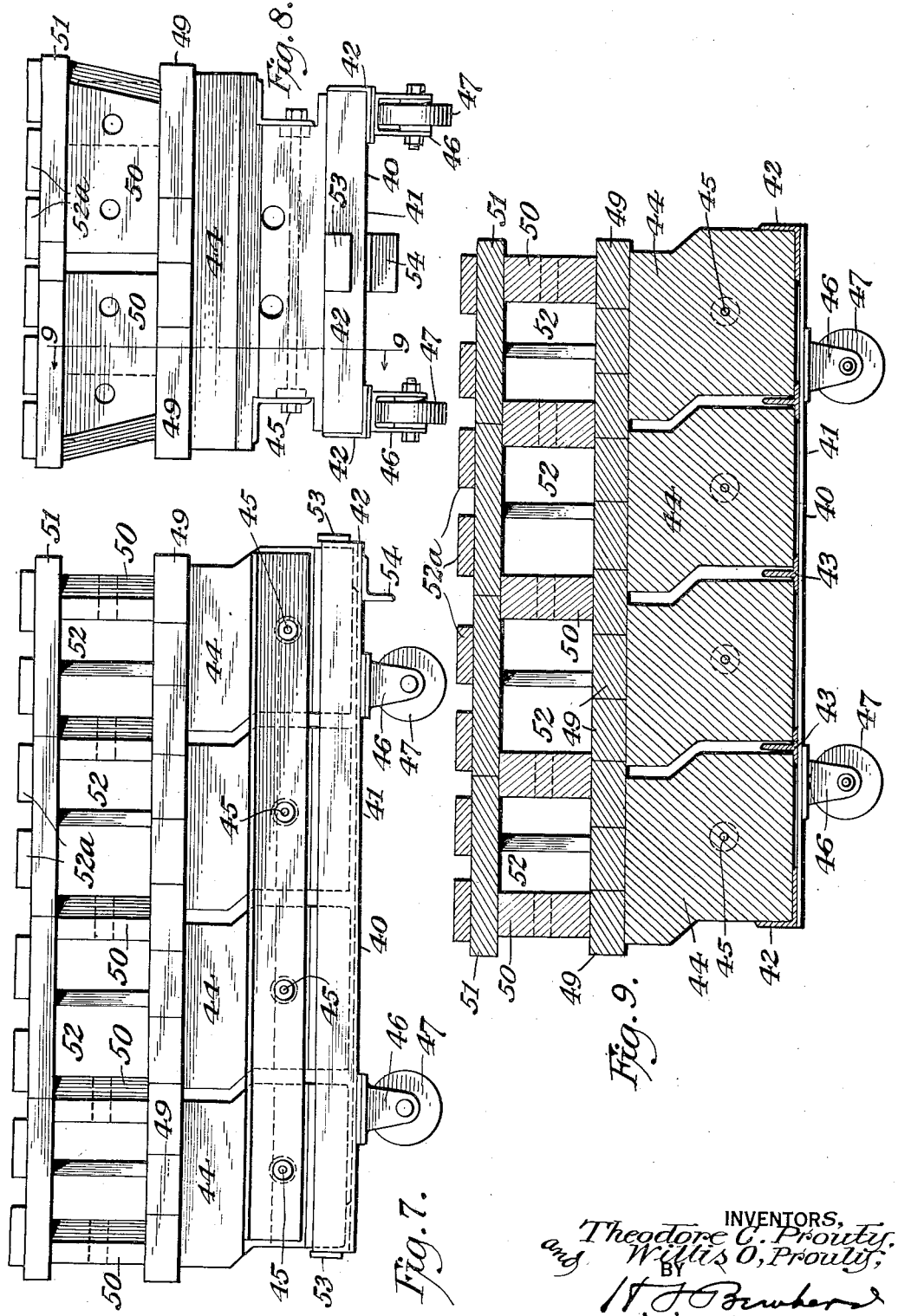

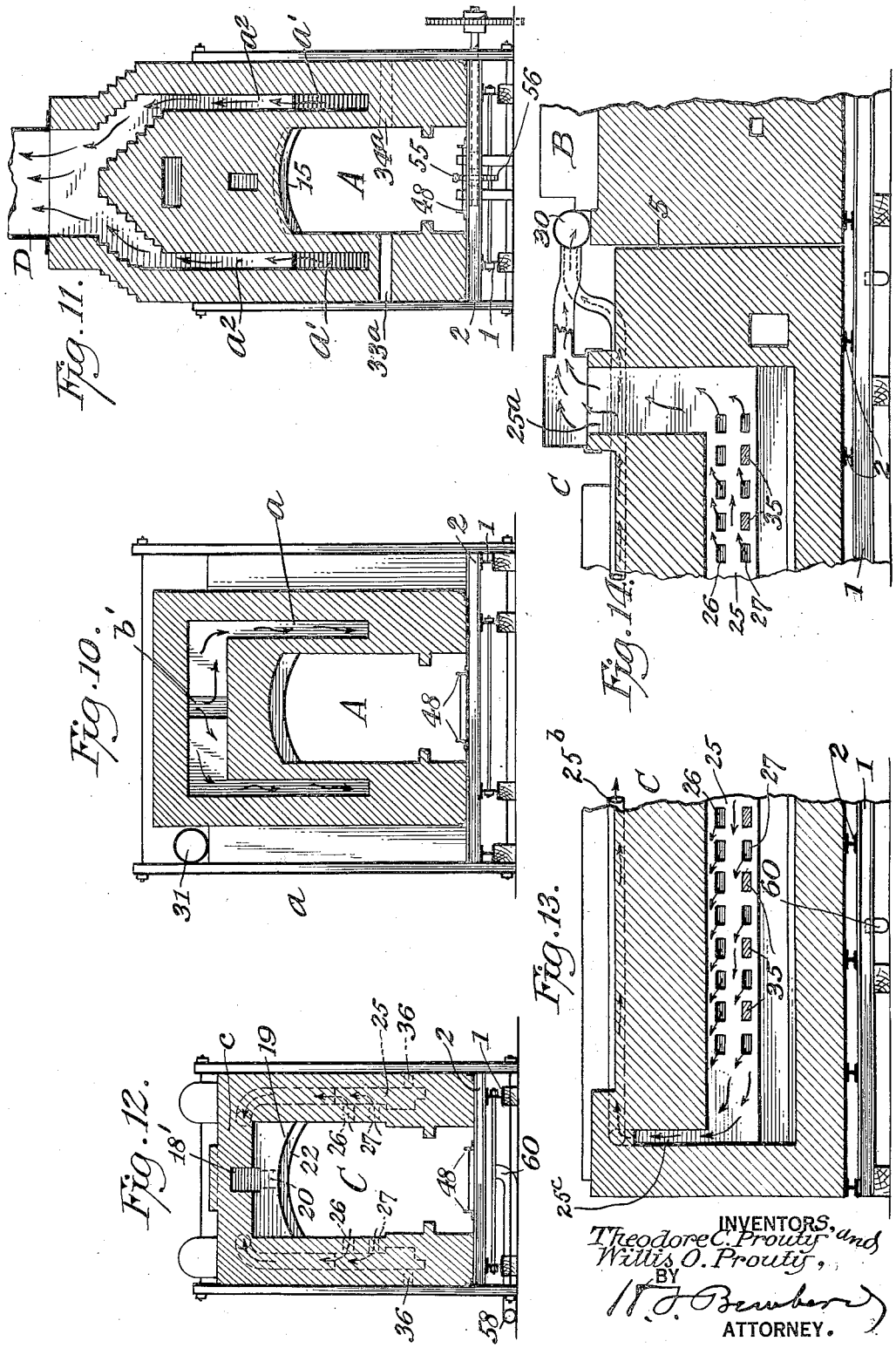

Patented June 14, 1932

1,862,548

UNITED STATES PATENT OFFICE

THEODORE C. PROUTY AND WILLIS OSWALD PROUTY, OF HERMOSA BEACH, CALIFORNIA, ASSIGNORS TO AMERICAN ENCAUSTIC TILING COMPANY, LTD., OF NEW YORK, N. Y., A CORPORATION OF NEW YORK

METHOD OF AND TUNNEL KILN FOR THE TREATMENT OF CERAMIC WARE

Application filed March 24, 1927. Serial No. 177,914.

This invention is a method of and tunnel kiln for the treatment of ceramic ware, the kiln of said invention being equipped with conveying means of one form or another for the transportation of material, such as ceramic products or ceramic ware, within a succession of zones which are designated as a pre-heating zone, a high temperature or maturing zone, and a cooling zone, with the result that the products are treated continuously, and in a determined order, and for definite periods of time, and the operations are conducted with economy of fuel and of labor and attain large productive capacity.

In a kiln of our invention we avoid the exposure of the product or ware to the direct contact with combustion flames emanating from burners and at the same time conduct the maturing or firing of said product within the high heat zone by the action of heat and gases at the appropriate maturing temperature, said gases enveloping a mass of said product or ware and being free to flow into intimate contact with all parts of the massed product, to the end that the product is matured or fired at a temperature suited to the character of the product, and such maturing is conducted under conditions which preclude scumming and discoloration of the product or ware by unburned constituents present initially in the combustion gases.

Another salient feature of our invention is a kiln open to the atmosphere at both the entry end and the delivery end of the kiln structure, so that the product or ware is under observation throughout the length of said kiln structure and at all stages in its treatment. There is no appreciable escape of combustion gases nor loss of heat attendant upon the use of an open-ended kiln structure, for the reason that the gases and heat from the high heat zone are utilized for heating the walls of the kiln at the pre-heating zone, with the result that such walls of said pre-heating zone are heated to a temperature at which heat is radiated from said walls into the pre-heating zone. Again, the heat radiated from the product or ware after it leaves the high heat zone and while such product is within the cooling zone, is utilized for heating the walls which bound the cooling zone, and such heat radiated from the mass of the product within the cooling zone and radiated also from the heated walls of said zone is utilized for pre-heating fresh atmospheric air adapted to be supplied in one way or another into contact with the massed product and with said zone walls, which fresh pre-heated air is conducted mechanically along the kiln and from said cooling zone to the pre-heating zone, into which latter zone the fresh pre-heated air is distributed by blowing the air at determined intervals along the length of said pre-heating zone and below the level of the massed products or ware therein. We thus make provision for the utilization of the high heat from the combustion gases and also of heat radiated from the mass of heated product within the cooling zone, and for conducting the heat so utilized to the pre-heating zone in a way to pre-heat the unfired product present within said pre-heating zone, whereby economy is attained by the utilization of waste heat.

According to our invention, the molded and unfired product or ware is pre-heated gradually from its entry into the pre-heating zone and during the period such product travels within said pre-heating zone slowly toward the high heat zone; but prior to the entry of the product into said high heat zone, the temperature of the product is raised to substantially the temperature prevailing within the high heat zone, which progressive increase of the product temperature is effected in the period required for the product to travel within the pre-heating zone, and which operation of gradually increasing the product temperature so conditions the product that it is not exposed suddenly to the high temperature prevailing within the high heat zone. The progressive heating of the unfired product to the maturing temperature present within the high heat zone is due in part to the radiation of heat from the combustion gases into the pre-heating zone, and in part to the contact with the product of pre-heated air supplied from the cooling zone as herein described; but we have found it desirable to employ one or more burners at or adjacent to the line of division between the pre-heating zone and the high heat zone, said burners operating to supply heat below the product and to furnish the heat units which are or may become necessary to raise the product temperature to the maturing temperature of the high heat zone, thus making certain the control of temperature within the pre-heating zone for increasing the product temperature to the maturing temperature prior to the entry of such product within the high heat maturing or firing zone of the kiln.

Provision is made for the outflow of fumes and combustion gases from the high heat zone through a flue in the crown of said zone and through flues in the walls of the pre-heating zone, said flues leading the escaping gases to a stack or uptake situated at or near the entry end of the kiln, whereby the burned gases and fumes make their exit from the high heat zone without passing into the cooling zone or into the pre-heating zone, and the masses of product or ware present in said cooling zone and in the preheating zone are not exposed to the direct contact with such burned gases and fumes.

Provision is made, also, for the exit from the cooling zone of fumes through the crown of said zone, and for the exit from said cooling zone of air preheated by radiation from the fired product by way of flues provided in the walls of said cooling zone, a portion of such preheated fresh air being exhausted from the side wall flues by the action of an exhauster and blower which operates to blow such pre-heated air into the pre-heating zone. The air thus supplied to the pre-heating zone makes its exit through the crown of such zone, but the air blown into said zone enters below the mass of ware, flows upwardly around the ware and into that part of the tunnel comprised by the pre-heating zone, and thence escapes through the crown, but the upwardly flowing air imparts some of the heat to the unfired product within said zone for preheating the latter.

In the kiln of our invention there is no direct contact of the product or ware with the flames emanating from the burners at any of the stages in the travel of such product or ware within the pre-heating, maturing, and cooling zones of the kiln. This is due to the introduction of the combustion flame from the burners into movable flues extending the full length of the tunnel chamber and below the massed product or ware moving at slow speed within said tunnel chamber. Said movable combustion flues are in the horizontal plane of the burners employed at the high heat zone and also used desirably at a certain point in the preheating zone; and thus the movable flues for the combustion flame are corelated to the burners for the combustion flames to be discharged from said burners directly into the movable flues, and hence there is no possibility of the burner flames flowing from said burners into direct contact with the massed product, as a result of which the products of combustion are burned within the movable flues, and the heat and gases thus evolved flow from said movable flues upwardly into the tunnel chamber for contact with the massed product contained therein and movable slowly therethrough. In one practical embodiment of our invention, the movable combustion flues are provided as components of product-carrying cars which are desirably provided for the transporation of the massed product within the tunnel chamber, said cars being introduced, propelled, and discharged relatively to the tunnel chamber and constituting an efficient means for transporting the product or ware, as well as affording means for loading and unloading the product with facility. Each kiln car is constructed with a bed composed preferably of relatively large blocks of refractory clay, a platform or table affording means upon which the product or ware may be stacked, and combustion flues intermediate between said bed and said platform; said combustion flues extending from side to side of the car and when a series of such cars are within the tunnel, said flues range crosswise of the tunnel chamber, practically from side wall to side wall of such chamber. The cars within the kiln have abutting contact with each other preferably at points centrally of the cars, and said cars extend in series for the full length of the tunnel chamber, and thus movable flues extending crosswise of the tunnel are provided for the full length of the kiln, into which flues there are discharged the combustion flames from the burners positioned at the high heat zone and at the pre-heating zone. There is discharged into said movable flues, also, the preheated air supplied by the blower to the pre-heating zone.

Our invention is useful for the heat treatment to be accorded to various products and, obviously, said invention may be used in different arts and for heating various materials; but said invention has been found to be useful particularly for heating ceramic products, and more especially for firing and maturing the bisque mixture composing the body of floor and wall tile. Without restricting or limiting the use of the kiln to any particular material or for a particular purpose, we will hereafter describe its structure and operation in connection with the procedure required for pre-heating, firing and cooling masses of bisque for the production of floor and wall tile.

Other functions and advantages of the invention will appear from the following description taken in connection with the accompanying drawings, wherein Figure 1 is a plan view of a tunnel kiln embodying our invention.

Figure 1ª and Figure 1ᵇ are plan views of the right hand portion and the left hand portion, respectively, of the tunnel kiln of our invention, said views being on an enlarged scale as compared with Figure 1 in order to show certain parts more clearly.

Figure 2 is a plan view of the entire kiln on the scale of Figure 1.

Figure 2ª and Figure 2ᵇ are views in side elevation of the right hand portion and the left hand portion, respectively, of the tunnel kiln, said Figure 2ª and Figure 2ᵇ being on an enlarged scale as compared with Figure 2 and on the same scale as Figure 1ª and Figure 1ᵇ, respectively.

Figure 3 and Figure 3ª are longitudinal sectional views of the right hand portion and the left hand portion of the tunnel kiln of our invention, said Figure 3 and Figure 3ª corresponding in scale to Figures 1ª, 2ª, and 1ᵇ, and 2ᵇ, respectively.

Figures 4, 5 and 6 are vertical cross sectional views on the planes indicated by the dotted lines 4—4, 5—5, and 6—6 respectively of Figure 1, said figures illustrating the kiln in cross section through the maturing or firing zone, the pre-heating zone, and the cooling zone, respectively.

Figures 7 and 8 are views in side elevation and in end elevation, respectively, of one kiln car constructed with transverse combustion flues in accordance with our invention.

Figure 9 is a vertical longitudinal section through the kiln car taken in the plane indicated by the dotted line 9—9 of Figure 8.

Figure 10 is a cross section through the kiln on the line 10—10 of Figure 1 illustrating the drop in the flues between the crown at the high heat zone and the side flues at the opposite walls of the pre-heating zone.

Figure 11 is a cross section on the line 11—11 of Figure 1 at the entry part of the tunnel chamber, showing the exit of the combustion gases into the stack.

Figure 12 is a cross section on the line 12—12 of Figure 1 showing the exit for the pre-heated air at the end of the cooling zone and the baffle construction whereby such pre-heated air is precluded from passing out of the cooling zone at the delivery end of the kiln structure.

Figures 13 and 14 are short longitudinal sections on the lines 13—13 and 14—14 of Figure 1ᵇ respectively illustrating the ports and flues whereby pre-heated air flows out of the cooling zone at the opposite end portions of said cooling zone, in order to flow through pipes to the exhauster and blower whereby such pre-heated air is blown into the pre-heating zone below the massed product and thus utilized for pre-heating the unfired product present within said pre-heating zone.

The kiln of our invention is built upon an underneath framing or substructure composed of metallic girders or beams, 1, and cross beams, 2, united together as by welding, said framing ranging the full length of the kiln, whereby the kiln structure as an entirety is elevated for an appreciable distance above the level of the floor, in order to provide a free open space below said kiln structure and for the whole length of the kiln, within which space atmospheric air is free to flow to effect the dissipation of heat radiated from the bottom part of the structure, in which respect our kiln is distinguished from some prior kilns the foundations of which are built upon the floor and in direct contact therewith so that there is no flow of atmospheric air below the kiln foundation. The kiln structure is composed of materials, such as refractory bricks, ordinarily employed in this art, and such kiln structure results in the production of a tunnel chamber constituting a pre-heating zone A, a maturing and high heat zone B, and a cooling zone C. The walls of the tunnel chamber present straight unbroken surfaces throughout the length of the kiln structure, except for the presence within the high heat zone of burner boxes 3, 4. At the pre-heating zone and at the cooling zone C, the side walls and the crown present continuous smooth surfaces, the same being advantageous for the reason that the ware, stacked or piled upon the conveying mechanism, may travel close to the surfaces of said walls, and large ware capacity is thus attained in a kiln of relatively small cross section. The high heat zone and the cooling zone are built in the first instance to provide an expansion joint at 5 which is initially about two inches (2″) in width, but after the kiln is first fired and is under heat for a determined period of time the walls expand and the expansion joint is packed tightly with a suitable heat resisting material, such as asbestos.

The high heat zone is of greater cross sectional area than the pre-heating zone or the cooling zone, to provide for the free upflow of heat and gases between the ware-conveying means and the side walls of the kiln at said high heat zone. In other words, the high heat zone B is both wider and higher within certain limits than the other zones A and C herein referred to as the pre-heating zone and the cooling zone, but except for this enlargement in the cross section of the high heat zone and for the presence of the burner boxes 3, 4, within said zone, the side walls of the kiln are continuous and present relatively smooth surfaces. The kiln structure is open at both ends, the open entry end for the ware being indicated at 6 and the open delivery end for the ware indicated at 7. The burner boxes 3, 4, are composed of refractory bricks or slabs built in the side walls and at the high heat zone, it being preferred to use a series of said burner boxes at each side wall and to arrange the burner boxes at one side wall in staggered order or relation to the burner boxes at the other side wall. Any desired number of burner boxes may be used, and said burner boxes may be of any desired form; but in our kiln said burner boxes are all positioned in a horizontal plane to deliver combustion gases below the level of the product or ware undergoing transportation within the kiln by the conveying means, and, furthermore, the flames emanating from the burner boxes and their associated burners 8, 9, pass directly into the movable combustion flues constituting elements of the ware-conveying means, as a result of which the products of combustion emanating from the burners are burned within the combustion flues and said combustion products do not come into contact directly with the ware or product, thus precluding scumming and discoloration of the ware. Fuel of one kind or another, such as coal, oil or gas, may be used to furnish the heat required, but for many reasons it is preferred to use natural gas supplied by mains at relatively low pressure to the burners 8, 9, the latter being of any construction suitable for the purpose.

In addition to burners 8, 9, we desirably use a burner 10 at the upper middle part of the maturing zone B, preferably one in each side wall for supplementing the action of said two series of burners 8, 9, in the maintenance of the maturing temperature in said zone B. Furthermore, we desirably employ burners 11, 12, in the side walls of the pre-heating zone A to furnish the heat required to bring the unfired product or ware within said pre-heating zone to the temperature, or substantially to the temperature, prevailing in said high heat zone, whereby the ware or product is not subjected to a sudden increase in temperature as said ware or product is carried from the pre-heating zone into the high heat or maturing zone. Said burners 11, 12, may obviously be of a construction suitable for the purpose; they are positioned in the side walls of the pre-heating zone adjacent to the maturing zone; said burners 11, 12, in the side wall are in staggered relation to similar burners in the opposite side wall, and said burners 11, 12, are in the horizontal plane of the movable combustion flues provided in or by the ware or product conveying means.

The side walls and the top of the kiln structure are of hollow formation at each of the three specified zones A, B, C, in order to minimize heat radiation, and to utilize the walls and roof for the exit of gases and for the flow of air whereby the escaping gaseous products of combustion give off heat to the walls of the pre-heating zone, and such walls at said zone radiate heat into the tunnel chamber at said pre-heating zone, the effect of which is that the escaping gases from the maturing zone contribute to the operation of pre-heating the unfired product or ware present within said pre-heating zone. The hollow roof $b$ at the maturing zone B provides a flue $b^1$ above the crown $b^2$ and in this crown are openings $b^3$ through which the heat and gases flow from the high heat zone into said flue $b^1$, the direction of movement of said heat and gases being lengthwise of the kiln structure, and forwardly from the high heat zone toward the pre-heating zone, as indicated by the arrows. The highly heated gases from the maturing zone B ultimately find their exit to a stack D situated at or adjacent to the entry end 6 of the kiln structure, but in the course of their flow lengthwise of the kiln such escaping gases pass from the crown flue $b^1$ into drop flues "$a$" provided at the connection of zones A, B and thence flow into and within longitudinal flues "$a^1$" provided in the side walls of the kiln at the pre-heating zone A. Such highly heated gases flowing within the side flues "$a^1$" give off heat which is absorbed by the side walls at the pre-heating zone, and such heated side walls radiate heat into the tunnel chamber at said preheating zone. The side flues "$a^1$" in the walls of the pre-heating zone are extended upwardly at their forward ends, near to the entry end 6 of the tunnel chamber, as indicated at "$a^2$" in Figure 11 of the drawings, such upward extensions "$a^2$" of the side flues being in communication with the stack D for the free escape of the heat and gases to the atmosphere.

At the preheating zone A, the roof "$a^3$" is hollow to provide an exit flue "$a^4$" above the crown "$a^5$" of said zone, and in this crown we provide exit openings 13, through which is free to flow the waste heat and the preheated air supplied to the preheating zone for heating the unfired product or ware present within said zone A. The flue "$a^4$" leads the waste heat and air from the preheating zone to an exit uptake 14 shown as being connected to the stack D whereby the draft through stack D and uptake 14 exhausts the waste heat and air from the pre-heating zone through openings 13 and flue "$a^4$".

The crown "$a^5$" of the preheating zone is not in a single horizontal plane nor is it uninterrupted from front to rear, but on the contrary said crown "$a^5$" is composed of members at different levels and these levels are separated by depending baffles 15, thus producing above the massed products or ware a plurality of open spaces 16 isolated one from the other by the baffles 15, the effect of which is to localize the upflowing heat and air and preclude such heat and air from flowing lengthwise of the preheating zone, and, furthermore, to reduce the tendency of the heat and air flowing upwardly around the unfired ware from passing toward the entry end 6 of the kiln structure.

In the crown "$a^5$" there is provided just within the entry end 6 to the tunnel chamber an exit opening 17, and at the entry end 6 is an arch 18 the under surface of which is below the crown "$a^5$", said arch being forwardly of the exit 17 and functioning as a baffle to the outflow of the ascending heat and air at the open entry end 6 to the tunnel chamber, thus precluding the escape of air and heat in appreciable volume through said kiln entry 6 and enabling the introduction of the loaded cars into the kiln structure without exposing the attendant workmen to a blast of heat or air from said kiln structure when said workmen are engaged in the performance of their duties at the charging end of the kiln.

The massed product or ware is conveyed from the maturing zone B into cooling zone C through which said ware passes at the speed determined for the performance of the heat treatment required, and while the fired product or ware is moving within said cooling zone toward the open delivery end 7 of the kiln structure, such ware or product is cooled progressively to the end that the ware is not exposed to a sudden drop in temperature at any stage between the exit from the high temperature zone B to the point where the ware emerges from the open delivery end 7. It will be understood that the massed product or ware when it passes into the cooling zone C is at the temperature of the maturing zone, and that it gives off fumes and gases while undergoing the cooling stage within zone C, but we have discovered that such fumes and gases given off by the ware may be discharged from the cooling zone and the heat radiated from such hot wares may be utilized for pre-heating atmospheric air to be conducted from the cooling zone to the pre-heating zone and there used for pre-heating the unfired ware or product, such pre-heated air being atmospheric air undiluted by the fumes or gases given off by the massed ware within the cooling zone or by combustion gases from the maturing zone.

The roof c of said cooling zone is formed with an exit flue 18' and with a crown 19, (see Figure 3ª) said crown having a series of openings 20 over the massed ware or product, through which openings the fumes or gases emanating from the ware together with some of the radiated heat is free to pass from the tunnel chamber into said flue 18', by which the escaping fumes and gases are conducted into an uptake 21 and thence discharged into the open air. The crown 19 over the tunnel chamber at the cooling zone is on a lower level than the crown over the maturing zone, and from said crown 19 depends one or more baffles 22 operating to arrest the flow toward the delivery end 7 of the kiln structure of the fumes and gases which pass to the roof, such baffles 22 arresting the flow longitudinally within the upper part of the cooling zone of the fumes and gases adapted to be drawn out of said zone by the draft through the uptake 21. Adjacent to the open delivery end 7 from the tunnel chamber is an exit 23 provided in the crown 19 and opening into the horizontal roof flue 18', and at the open delivery 7 is an arch 24, depending below the crown 19 and functioning as a baffle in arresting the escape from the tunnel chamber at the delivery end 7 of hot air, fumes and gases from said cooling zone, particularly from the upper portion thereof, thus precluding hot air and gases from flowing from the cooling zone through the open delivery end 7 and blowing against workmen engaged in unloading the ware as it leaves the kiln or in shifting the loaded cars after the latter emerge through said delivery end 7.

The side walls of the kiln structure at the cooling zone C are of hollow formation from a line adjacent to the expansion joint next to the high heat zone to a line adjacent the arch 24 at the open delivery 7, thus producing longitudinal flues 25 in the side walls, and with said flues communicate a plurality of series of ports 26, 27 extending in horizontal rows in the inner portions or sections of said hollow side walls at said cooling zone. These ports of the various horizontal series are at different levels with respect to the ware or product loaded on the kiln cars.

The horizontal row of ports 27 in the respective side walls are in horizontal plane of the ware on the kiln cars above the ware-supporting platforms or tables of said cars, and the other rows of ports 26 are in a horizontal plane just below the tops of the massed ware or product loaded on said cars. The walls of the kiln at the cooling zone absorb some of the heat radiated from the heated masses of the ware, and said walls become heated to a relatively high temperature so as to radiate heat into the longitudinal flues 25 and into the tunnel chamber. Atmospheric air in an undiluted condition, or in a substantially undiluted and pure condition, flows upwardly around the kiln cars from the open floorless lower part of the kiln structure, and such upwardly flowing air circulates around and into intimate contact with the heated ware on the kiln cars, some of the air being free to flow into the upper part of the cooling zone C from which the air with the fumes and gases is exhausted through the crown flue 18 by the draft from the uptake 21, but some of this air flows out of the tunnel chamber through the rows of ports 26, 27, the temperature of such outflowing air being raised to a substantial extent by radiant heat from the massed ware and from the walls of the kiln at the cooling zone. The pre-heated air is exhausted mechanically from the flues 25 of the cooling zone by the operation of a blower and exhauster 29, located at the pre-heating zone A and operatively connected with the side flues 25 of the cooling zone, such operative connection being afforded by one arrangement or other of pipes extending outside of the kiln structure, lengthwise thereof. The flues 25 in the respective side walls at the cooling zone are extended upwardly at 25$^a$ in the kiln walls adjacent to the high heat zone, see Figure 14, and these flues deliver pre-heated air into a cross flue 30, extending over the kiln structure near the high heat zone. From this cross flue, the pre-heated air flows through longitudinal pipe 31 extending along the top of the kiln structure, at one side thereof, and this pipe delivers air to the intake of the exhauster and blower 29, the latter being driven by any appropriate means such as a motor, and said exhauster being of the required capacity. The pre-heated air is distributed within the pre-heating zone A below the level of the ware or product therein, and for effecting such distribution we provide a distributing drum or chamber 32 and two series of distributing pipes 33, 34. The drum 32 is located above the kiln structure at the ware-pre-heating zone A thereof, said drum being connected with the blower 29 by a short length of pipe 32$^a$ leading from the outlet of said blower. The distributing pipes 33 extend from the drum 32 down one side of the kiln and are spaced or separated, whereas the other series of distributing pipes 34 extend from the drum 32 down to the opposite side of the kiln, said pipes 33, 34, of the two series terminating in ports 33$^a$, 34$^a$, provided in the respective side kiln walls at different points intermediate the entry 6 and the burners 11, 12, and said ports 33$^a$, 34$^a$, of the two series for the pre-heated fresh air open into the tunnel chamber at the pre-heating zone thereof and in the horizontal plane of the combustion flues provided in the kiln cars.

As an additional means for taking pre-heated air from the cooling zone C of the kiln and for feeding such preheated air by the action of the exhauster and blower 29 to the pre-heating zone A, we have shown ducts or flues 25$^b$ (see Figures 1, 1$^b$ and 2$^b$) extending along the top part of the cooling zone C. These flues 25$^b$ at the car delivery end of the zone C open into a drop flue 25$^c$ (see Figures 3$^a$ and 13), which connects with the chamber of cooling zone C about on the level of ports 26, 27, whereas the other or forward ends of these ducts or flues 25$^b$ open into the cross connection 30, so that the exhauster 29 exhausts air through drop flue 25$^c$ and top flues or ducts 25$^b$ for delivery through distributor 32 and pipes 33, 34, as herein described.

The hollow kiln walls at the cooling zone C are exposed to relatively high heat radiated from the massed ware, and to insure stability of such hollow walls, it is preferred to construct each wall with header brick 35, the header brick being used alternately with the other wall brick and such header brick extending crosswise of the side flues 25. If desired, the hollow walls at the cooling zone may be provided in the outer sections of such walls with air inlet ports 36 which open into the side flues 25 at the lower ends of said flues 25, whereby fresh atmospheric air from the outside of the kiln may be admitted to the flues 25 for the purpose of being heated by contact with the hollow walls. It is preferred, however, to close such ports 36 by blocks or bricks 37 acting as stoppers to exclude external air from entering the flues 25, and to rely for the supply of fresh air to the cooling zone upon that air which is admitted through the floorless lower portion of the kiln structure and which flows upwardly around the kiln cars and the massed ware thereon, and thence through the rows of ports 26, 27, into the side flues, 25, and thence to the blower 29.

Means appropriate for transporting the massed ware or product are used within the kiln structure and the several zones thereof, and although a traveling conveyor may be employed for such transportation, it is preferred to use a succession of kiln cars, for the reason that said cars when outside of the kiln may be loaded and unloaded with ware or the product, to give employment to the workmen when not otherwise engaged. Various constructions of kiln cars are available for use, but in our kiln we have devised and provided a special type of car which experience shows can be kept in serviceable condition at economical repair expense, and which car has marked utility with respect to the combustion of the flames emanating from the burners at the high heat zone B and at the pre-heating zone A; in short, the cars which we use are directly related to the combustion burners with the definite purpose of burning the gaseous products of combustion within flues provided in the cars themselves and such combustion of the gaseous products takes place prior to the admission of the resulting heat and gases to either the high heat zone or to the pre-heating zone, whereby discoloration of the ware is precluded and the ware or product is exposed only to heat in the maturing zone and also to heat and pre-heated air within the ware pre-heating zone.

In Figures 7, 8 and 9 of the drawings there is shown a practical form of car which we have used in the kiln for the transportation of a mass of the product or ware, the same being stacked in piles separated by spaces to provide for the free access of heat and air to the mass when the car is moving within the pre-heating zone, for the free circulation of heat at the maturing or firing temperature when in the high heat zone, and for the unobstructed radiation of heat from said mass and for the contact of air with such mass when in the cooling zone. Each car comprises in its construction a metal underframe 40 composed of a template 41 with angle iron members 42 and T-iron bars 43 welded and bolted to produce a rigid structure for carrying a plurality of masses of heat-resisting material in the form of refractory clay blocks 44, the latter being firmly seated within the metallic underframe, and each block being stayed by a through bolt 45. The underframe is equipped with wheel hangers 46 for the wheels or rollers 47, the latter being in contact with rails 48 which extend within the tunnel chamber for the full length thereof. The refractory clay blocks 44 are relatively separated by the upstanding ribs of the T-irons 43, and upon said blocks are slabs 49 which support a series of flue walls 50, composed of heat resisting material, such as refractory clay. Upon the flue walls is imposed a table or platform 51 composed of slabs of refractory material or a heat resisting compound having carborundum incorporated therewith. The several elements 44, 49, 50, 51, are solidly united into a unitary structure to carry the weight of the load and intended primarily for withstanding the heat and temperatures prevailing within the high heat zone and the cooling zone of the tunnel chamber. In this connection it is desired to direct attention to the presence of the flue walls 50 intermediate the refractory clay blocks 44 and the table or platform composed of the slabs 49, said flue walls being arranged parallel to each other and extending from side to side of the kiln car whereby there is provided a series of flues 52 intermediate the height of said car. These flues are open at their ends, and said flues are in the horizontal plane of the burners 8, 9, positioned at the high heat zone B and they are also in the horizontal plane of the burners 11, 12, at the pre-heating zone A. It is preferred to provide each flue wall 50 with beveled or inclined ends, for deflecting the flames emanating from the burners during the period in the slow movement of the car when the ends of said flue walls 50 are opposite to the burners 8, 9, 11, 12. In practice, we use a burner of a type operating to project a relatively short flame from and beyond the delivery orifice of such burner, but it is to be particularly observed that such flames from the series of burners are directed into the combustion flues 52 of the movable cars, within which flues the products of combustion are burned prior to the flow of heat upwardly away from the car flues, and upwardly between the side walls of the kiln and the stacks or piles of ware imposed upon the cars. By thus burning the gases within the combustion flues 52 of the conveying means, the gaseous products of combustion are consumed and the heat evolved circulates within said movable flues for heating to high temperature the slabs 49 composing the tables, and such heat in a condition substantially free from unburned products thereafter flows upwardly between the kiln walls and the ware, and circulates also, over and through the ware, and to all parts of such massed ware. It is preferred to use upon the car table of refractory slabs 51 a series of refractory members $52^a$ the faces of which are ground by appropriate means to produce a true plane surface upon which is imposed the stack or pile of ceramic products or ware, such accurate plane surfaces of the members $52^a$ affording means whereby a stack of ware may be placed by hand so as to reduce to a minimum any tendency of the stacked ware to topple over in the operation of moving the ware within the several zones of the tunnel chamber and for the period necessary for effecting the heat treatment of said ware.

At the fore and aft ends of the kiln cars, the refractory blocks 44 are recessed to effect an overlap in the abutting engagement of one car with other cars in front and to the rear throughout the series of such cars adapted to fill the tunnel chamber for substantially the length of the kiln. The cars, however, are provided with bumper plates 53, preferably welded to the metal underframe and positioned centrally thereof so that each car has abutting contact at the middle portion of said substantial underframing.

For propelling the loaded cars within the tunnel chamber, we employ means at the entry end of the kiln operable to engage with an end car of the series used when said end car is introduced into position, and to this end we provide each car with a trigger 54, suitably attached to the metallic underframing and adapted for engagement with one of a series of propelling members 55 provided on an endless driving chain 56. The car propelling mechanism is not described at length in this specification nor illustrated in detail in the drawings, for the reason that it constitutes the subject of a separate application. It is noted, however, that the rails 48 are inclined slightly from the horizontal, such inclination being downwardly from the delivery end 7 toward the entry end 6, whereby the series of cars tend by gravity to maintain the desired abutting contact one with the other throughout the series of cars, the car-propelling mechanism which includes the endless drive 56 acting substantially constantly to overcome the inertia of the loaded cars upon the inclined railway and to thus propel the cars at regular slow speed within the tunnel chamber and to aid in retaining the cars into close contact without resorting to special mechanism to secure such close contact.

It is desirable to maintain in a relatively cool condition the metallic underframing and running gear of the kiln cars, especially the cars which are present within the high heat zone and the cooling zone of the kiln structure, in order to overcome the deteriorating effects of high temperatures upon said car structures and to reduce the cost of repairs required for keeping the cars in serviceable condition. To attain a cooling effect upon the cars below the ware platforms of such cars, we provide means for the circulation of atmospheric air as a cooling agent within the lower portion of the tunnel chamber and at the high heat zone and the cooling zone thereof. Such means for the circulation of the cooling air may assume various structural forms, but in the drawings there is shown a blower 55$^b$, positioned at one side of the kiln structure, intermediate the ends thereof, said blower being driven by appropriate means, such as a motor 56$^b$, see Figure 1 and Figure 1$^b$. To the outlet of the blower is connected a main pipe or wind trunk 57, ranging alongside the kiln structure, and to the wind trunk 57 is connected a second wind trunk 58, the latter extending along side the kiln structure but running in an opposite direction. From the wind trunk 57 extends a series of branch pipes 59 which are positioned in the lower portion of the tunnel chamber at the high heat zone thereof. A similar series of branch pipes 60 extend from wind trunk 58 into the lower portion of the tunnel chamber at the cooling zone thereof. Said branch pipes 59, 60, operate to distribute air below the cars within the high heat zone and the cooling zone, respectively, the air being blown into the tunnel chamber below the refractory clay blocks of the kiln cars. The air thus supplied is free to circulate into contact with the metallic underframing and running gear of the kiln cars for cooling the metal parts, but as both the entry end and the delivery end of the tunnel chamber are open at all times, the air thus blown into the lower portion of the tunnel chamber does not tend to establish an appreciable pressure within the tunnel chamber below the ware platforms of the cars. In our tunnel kiln we do not use sand seals between the tunnel walls and the kiln cars nor make provision to exclude the downflow of heat from the upper portion of the tunnel chamber into the lower portion thereof, but on the contrary we provide for the mechanical introduction into, and the free circulation of air within, the lower part of a tunnel chamber the respective ends of which are open at all times to the outside atmosphere, and the air thus blown into the kiln below the ware-cars is free to flow into contact with the underframing of the cars for cooling the same against the effect of heat within the high temperature and cooling zones. Furthermore, the air thus blown into the lower portion of the tunnel chamber flows upwardly around the sides of the cars, there being no sand seals or other sealing means to arrest such upflow of air, and such air flowing upwardly between tunnel walls and the side of the cars mingles to a certain extent with the heat and gases within the maturing zone whereas the air flowing upwardly into the cooling zone is exposed to the heat radiated from the masses of ware on the cars within said cooling zone. In our kiln we conduct the operations of feeding air within the lower portion of the tunnel chamber, within which no seal is present between the cars and the tunnel walls, in such manner as to preclude a balancing of pressures between the upper and lower portions of our tunnel chamber, but as a plentiful supply of atmospheric air is obtained in the lower part of the tunnel chamber by the construction of a floorless kiln structure all the parts of which are elevated above the level of the floor of the plant, we may dispense with, and wholly omit, the blower 55 and the air feeding and distributing means herein mentioned.

The operation will be understood from the foregoing description taken in connection with the drawings, but may be summarized briefly as follows: The kiln is heated preliminarily by starting the burners 8, 9, into use, and after the lapse of an appreciable interval of time, the loaded cars are introduced, and the blowers, one or both, and the pre-heating burners, 11, 12, are started. The cars are loaded outside of the kiln by stacking the ware or other products upon the setter slabs of said kiln cars, care being taken when loading the ware that spaces be left between the piles for the free circulation of air and of heat into contact with all parts of the ware or product. The loaded cars travel on the inclined rails, and said cars are pushed successively into the tunnel chamber by the action of the propelling mechanism. Said loaded cars travel within the tunnel chamber, successively within the pre-heating, maturing and cooling zones thereof, in which zones the ware is subjected to treatment for specific purposes. The ware on the cars within the preheating zone A is exposed to the heating effect of air pre-heated in the cooling zone, and of heat radiated from the walls of the pre-heating zone, and of heat from the combustion gases evolved by the service of the burners 11, 12, whereby the unfired or molded ware while present in the pre-heating zone is progressively heated to increasing temperatures as said ware travels from the open entry 6 toward the high heat zone and, furthermore, such ware as it approaches the high heat zone B is heated to substantially the maturing or firing temperature prevailing within said high heat zone in order that the unfired ware may not be subjected to a sudden increase in temperature upon the entry within the high heat zone. It is to be noted that the ware within the pre-heating zone, as well as the ware present within the high heat zone, is not exposed to contact with unburned products of combustion from the burners, for the reason that the combustion gases pass from the burners directly into the combustion flues 52 of the kiln cars, within which kiln car flues the burner gases are burned, whereupon the heat and gases thus evolved flow out of the kiln-car flues and pass upwardly between the kiln walls and the cars and the ware stacked upon said cars, thus precluding unburned products of combustion from having access to the ware at any stage of the treatment of such ware within the pre-heating or the high heat zones of the kiln. The ware is moved at slow regulated speed within the tunnel chamber, and remains in the several zones thereof for the periods of time required for the several stages of pre-heating, maturing and cooling the product, but in the high heat zone, the heat and gases are at what may be termed a maturing temperature required for firing the bisque, such heat and gases flowing freely into the ware, within and through the spaces intervening the stacks or piles, and into intimate contact with all parts of such ware. The movement of the ware from the high heat zone into the cooling zone is not attended by a sudden drop in the temperature of said ware upon its entry into the cooling zone, but on the contrary, the ware enters the cooling zone and moves therein for a definite distance before it is exposed to the action of cooling air, and, further, the ware moving within the cooling zone is cooled gradually from the place at which it emerges from the high heat zone toward the open delivery end 7 of the tunnel chamber, with the result that the ware passing from the tunnel chamber and out through the delivery end 7 will have been sufficiently cooled to a degree permitting the kiln cars to be handled manually and the fired bisque to be unloaded. Within the cooling zone, the heated masses of ware are free to radiate heat into the said zone, to be taken up in part by the walls of the kiln and in part by atmospheric air flowing upwardly between the kiln walls and the loaded cars, whereby the pre-heated air flows through ports 26, 27, into the side flues 25 and is exhausted by the blower acting to deliver such preheated air into the pre-heating zone of the tunnel chamber. It is to be noted that at all stages, there is a free flow from the crowns of several zones, which flow is accelerated by the draft from the stacks or uptakes. Thus, the combustion gases from the high heat zone flow upwardly through the openings in the crown, thence within the side flues at the pre-heating zone, and thence to the stack. Again, the air within the pre-heating zone finds an exit through the openings in the crown, thence by the flues, to the uptake. Further, the fumes and gases due to the radiation of heat from the fired ware within the cooling zone find their exit from said zone through openings in the crown, thence by the flue to the uptake, whereas the cooling air, pre-heated by the ware, flows freely from the cooling zone through the plurality of series of ports in the side walls of said cooling zone, and thence by the pipes to the blower, whence the air is blown into the pre-heating zone. There is thus a free vent for the fumes and gases from the upper parts of the pre-heating, maturing and cooling zones, and it follows that the action of blower 55b in feeding air into the tunnel chamber below the cars within the high heat zone and the cooling zone does not, in fact, establish a balanced pressure between the upper and lower parts of the tunnel chamber at either of the zones thereof.

Having thus fully described our invention, what we claim as new and desire to secure by Letters Patent is:

1. In a tunnel kiln, a tunnel chamber, means for conveying products therethrough, means for pre-heating air by heat emitted from said products within a definite part of said chamber, means for venting said definite part of the chamber through the crown thereof for effecting the outflow of fumes and gases evolved with the radiation of heat from the fired product, and means for blowing the pre-heated air into a ware pre-heating zone of said chamber and substantially below the level of the products therein.

2. In a tunnel kiln, a tunnel chamber, means for conveying products therethrough, means at a definite part of said tunnel chamber for pre-heating air by heat radiated from the product, means for venting said definite part of the tunnel chamber whereby fumes and gases evolved with the radiation of heat from the fired product are discharged from said chamber separately from the pre-heated air, and means for feeding the pre-heated air into the ware pre-heating zone of said tunnel chamber.

3. In a tunnel kiln, a tunnel chamber open at the respective ends thereof, product conveying means movable within said chamber, means at a definite part of said tunnel chamber for venting the same freely and discharging therefrom fumes or gases evolved with the radiation of heat from the product present within said part of the chamber, means at said definite part of the tunnel chamber for pre-heating air by heat emitted from said product without diluting such pre-heated air by admixture with the fumes and gases, and means for blowing the pre-heated air into the ware pre-heating zone of the tunnel chamber whereby the pre-heated air is utilized for pre-heating unfired products within the last mentioned part of said tunnel chamber.

4. In a tunnel kiln for treating ceramic products, a tunnel chamber constituting pre-heating, maturing and cooling zones for subjecting the ceramic products to successive stages of heat treatment therein, means for firing the maturing zone, product-conveying means operable within said tunnel chamber, means for venting each zone for the free exit through the crown thereof of waste gases and fumes, and means whereby air pre-heated within the cooling zone is delivered into the tunnel chamber at the pre-heating zone.

5. In a tunnel kiln for treating ceramic products, a tunnel chamber constituting a succession of zones wherein ceramic products may be pre-heated, matured and cooled, means for the maintenance of a maturing temperature within the maturing zone, product-conveying means operable within said tunnel chamber, and means for supplying heat to said pre-heating zone whereby unfired ceramic products present within said pre-heating zone are heated to substantially the maturing temperature prevailing in said maturing zone and prior to the entry of said unfired product within said maturing zone.

6. In a tunnel kiln, a tunnel chamber including a maturing zone and a pre-heating zone, product-conveying means operable within said tunnel chamber, means for the maintenance of a maturing temperature within said maturing zone, and means for feeding heat to said pre-heating zone for pre-heating the product therein to the temperature prevailing within said maturing zone and prior to the entry of said product into said maturing zone, whereby the product passing from the pre-heating zone into said maturing zone is not exposed to a sudden increase in temperature upon the enry of the product into said maturing zone.

7. In a tunnel kiln, a tunnel chamber constituting pre-heating, maturing and cooling zones, product-conveying means operable within said tunnel chamber, and a plurality of sources of heat cooperable with said pre-heating zone for progressively heating the product present within said pre-heating zone whereby the product prior to entry into the maturing zone is heated gradually to the temperature prevailing within said maturing zone.

8. In a tunnel kiln, a tunnel chamber constituting pre-heating, maturing and cooling zones for the product under treatment, product-conveying means movable within said tunnel chamber, flues for conducting waste heat from the maturing zone through the walls of said pre-heating zone, whereby heat is transferred to the pre-heating zone, and other sources of heat cooperable with said pre-heating zone for progressively heating the product to substantially the temperature prevailing within the maturing zone as the product moves from said pre-heating zone into the maturing zone.

9. In a tunnel kiln, a tunnel chamber constituting pre-heating, maturing and cooling zones for the product under treatment, product-conveying means operable within said tunnel chamber, means whereby heat from the waste gases flowing out of the maturing zone is transferred to the pre-heating zone, means for pre-heating air by waste heat in the cooling zone and feeding such pre-heated air to the pre-heating zone, such pre-heated air flowing into said preheating zone substantially below the level of the ware on said product conveying means, and heating means cooperable with the pre-heating zone for increasing the temperature of said product while moving within said pre-heating zone to substantially the temperature prevailing within the maturing zone.

10. In a tunnel kiln, a tunnel chamber including pre-heating, maturing and cooling zones, product-conveying means for moving the product within said chamber, means for the free exit of waste gases from the pre-heating zone, and a plurality of sources of heat cooperable with the pre-heating zone and effective in progressively heating said product as the latter is conveyed within the pre-heating zone and prior to the entry of said product into the maturing zone.

11. In a tunnel kiln, a tunnel chamber including pre-heating, maturing and cooling zones, product-conveying means for moving the product within said chamber, means for exhausting from said pre-heating zone waste gases present within said zone above the product-conveying means, and a plurality of sources of heat cooperable with said pre-heating zone for effecting a progressive increase in the product temperature as said product is carried within said pre-heating zone and prior to the entry of the product into the maturing zone.

12. In a tunnel kiln, a tunnel chamber constituting pre-heating and maturing zones, product-conveying means operable for moving the product within said zones, a flue in the crown of the maturing zone for the free exit of heat and gases from said maturing zone, and other flues in the walls of the pre-heating zone, said other flues and the crown flue being connected for conducting waste heat and gases from the maturing zone to a stack whereby heat from the escaping gases is transferred to the pre-heating zone for heating the product within said pre-heating zone.

13. In a tunnel kiln, a tunnel chamber constituting pre-heating and maturing zones, product-conveying means operable for moving the product within said zones, means for conducting the waste heat and gases from the crown of said maturing zone and transfer heat to the pre-heating zone for heating the product movable within said pre-heating zone, and means for exhausting heat and gases from said pre-heating zone and present in the tunnel chamber above the product-conveying means.

14. In a tunnel kiln, a tunnel chamber, product conveying means operable for moving the product within said tunnel chamber, means for the free exit through the crown of said tunnel chamber of waste heat and gases present in definite areas above said product conveying means, and means for conducting waste heat and gases from different areas of said tunnel chamber to another ware pre-heating zone of the tunnel chamber, whereby waste heat and gases are utilized for progressively pre-heating the product subsequent to its entry into the chamber and as said product is conveyed within said chamber.

15. In a tunnel kiln, a tunnel chamber constituting pre-heating, maturing and cooling zones each provided with means for the free exit through the crown thereof of waste heat and gases, whereby said zones are separately vented, product-conveying means cooperable with said chamber, and means for supplying heat to said pre-heating zone to effect a progressive heating of the product movable within said zone toward the maturing zone.

16. In a tunnel kiln, a tunnel chamber constituting a succession of zones each provided in the crown thereof with means for the exit of waste heat and gases, product-conveying means cooperable with said chamber, means for heating air to a cooling zone of the chamber and blowing such air into a ware pre-heating zone of the chamber and below the product-conducting means, and heat-supplying means for maintaining a maturing temperature within a maturing zone and intermediate the aforesaid two zones.

17. In a tunnel kiln, a tunnel chamber constituting a succession of zones each provided in the crown thereof with means for the exit of waste heat and gases, means for exhausting such waste heat and gases from the crown of each zone, product-conveying means cooperable with said chamber, and means for supplying heat to a ware pre-heating zone within which the product is pre-heated progressively and to substantially the maturing temperature prevailing in a maturing zone.

18. In a tunnel kiln, a tunnel chamber, product-conveying means cooperable therewith, means for maintaining a maturing temperature within a definite length of said chamber, and means for pre-heating the unfired product within another definite length of said chamber substantially to the maturing temperature prevailing within the first named length of said chamber.

19. In a tunnel kiln, a tunnel chamber, product-conveying means cooperable therewith, means for maintaining a maturing temperature within a definite length of said chamber, means in the crown of said definite length of the chamber for the free exit therefrom of waste heat and gases, and means for pre-heating the unfired product within another definite length of said chamber substantially to the maturing temperature.

20. In a tunnel kiln, a tunnel chamber, product-conveying means cooperable therewith, means for maintaining a maturing temperature within a definite length of said chamber, and a plurality of heating means cooperable with another length of said chamber and operating to progressively increase the temperature of the unfired product therein until such product is heated to substantially the temperature prevalent within said first named length of the chamber.

21. In a tunnel kiln, a tunnel chamber constituting pre-heating, maturing and cooling zones, product-conveying means cooperable therewith, means for venting the cooling zone by the free exit therefrom of fumes and gases evolved with the radiation of heat from the matured product present within said cooling zone, means positioned at the cooling zone whereby atmospheric air is pre-heated by heat emitted from the matured product, and means for conducting such pre-heated air and distributing the same within the pre-heating zone substantially below the level of the product present therein.

22. In a tunnel kiln, a tunnel chamber constituting pre-heating, maturing and cooling zones, product-conveying means cooperable therewith, means for exhausting from the space above the product within the cooling zone the fumes and gases evolved by cooling the matured product within said cooling zone, means for pre-heating air admitted to the cooling zone by heat emitted from the product being cooled within said zone, and means for conducting pre-heated air from said cooling zone and feeding such air to the pre-heating zone below the level of the unfired product therein.

23. In a tunnel kiln, a tunnel chamber constituting pre-heating, maturing and cooling zones, product-conveying means cooperable therewith, said cooling zone being provided with a perforated crown and with an exit flue through which are free to escape the fumes and gases from the matured product undergoing cooling within said zone, means for pre-heating atmospheric air admitted to said cooling zone by heat emitted from the product present in said zone, and means for distributing the pre-heated air within the pre-heating zone.

24. In a tunnel kiln, a tunnel chamber constituting pre-heating, maturing and cooling zones, product-conveying means cooperable therewith, air flues and ports in the walls of the cooling zone whereby air admitted to said cooling zone is pre-heated by the matured product which is being cooled within said zone and such air makes its exit from the cooling zone by way of said ports and flues, and means for conducting the pre-heated air and distributing the same within the pre-heating zone.

25. In a tunnel kiln, a tunnel chamber constituting pre-heating, maturing and cooling zones, product-conveying means cooperable therewith, means at the cooling zone for utilizing heat emitted from the matured product within said cooling zone for heating atmospheric air admitted to said zone, a blower for exhausting such pre-heated air, and distributing means for feeding the pre-heated air to the pre-heating zone.

26. In a tunnel kiln, a tunnel chamber constituting pre-heating, maturing and cooling zones, product-conveying means cooperable therewith, means at the cooling zone for utilizing heat emitted from the matured product within said cooling zone for heating atmospheric air admitted to said zone, a blower for exhausting such pre-heated air, a drum connected with said blower, and a plurality of distributing pipes connected with the drum and arranged for distributing the pre-heated air at intervals within the pre-heating zone and below the level of the product on said product-conveying means.

27. In a tunnel kiln, a tunnel chamber, furnaces therefor, product conveying means, combustion means movable relatively to said furnaces and co-operable therewith for receiving therefrom the products of combustion, said combustion means discharging into the tunnel chamber the gases evolved by combustion within said combustion means, and means in the crown of said tunnel chamber for the exit of fumes and gases above the level of the products movable within the tunnel chamber.

28. In a tunnel kiln, a tunnel chamber, furnaces therefor, product conveying means, combustion means carried by the product conveying means below the level of the product to be imposed thereon, said combustion means being co-operable with said furnaces and affording chambers for the combustion of gaseous products from said furnaces, said combustion means discharging into the tunnel chamber the gases evolved by the combustion of said gaseous products, and means for venting said tunnel chamber.

29. In a tunnel kiln, a tunnel chamber, furnaces therefor, combustion means composed of refractory material adapted to be heated to a substantially incandescent condition and functioning as means for effecting the burning of unconsumed products of combustion emanating from said furnaces, said combustion means movable within said tunnel chamber relatively to said furnaces and said combustion means discharging into said tunnel chamber the gases evolved by the combustion within said combustion means, and means for venting the tunnel chamber.

30. In a tunnel kiln, a tunnel chamber, heating means therefor, product conveying means, and combustion flues movable with said conveying means, said combustion flues cooperating with said heating means for burning the products of combustion supplied by said heating means, and said combustion flues discharging directly into the tunnel chamber the gases evolved by burning said products of combustion.

31. In a tunnel kiln, a tunnel chamber, heating means therefor, product conveying means, and combustion flues movable with said conveying means, said combustion flues being crosswise of the tunnel chamber and co-operable with said heating means, said combustion flues opening into the tunnel chamber for discharging directly thereto the gases evolved by combustion within said flues, and means for venting the tunnel chamber substantially at and above the level of the product on said product conveying means.

32. In a tunnel kiln, a tunnel chamber, heating means therefor, product-conveying means, combustion flues unitary with said product-conveying means and ranging crosswise thereof, said combustion flues being substantially in the plane of the heating means for receiving flames and gases directly from the heating means, and said combustion flues discharging the burned gases directly into the tunnel chamber, and means connected with the tunnel chamber for discharging fumes and gases from said tunnel chamber independently of the combustion flues.

33. In a tunnel kiln, a tunnel chamber, heating means therefor, ware conveying means, combustion flues unitary with said conveying means and movable therewith relatively to said heating means, and means for exhausting above the level of the ware within the tunnel chamber the gases delivered to said chamber by the combustion flues together with the fumes emanating from the ware.

34. In a tunnel kiln, a tunnel chamber, heating means therefor, product conveying means, and combustion flues unitary with said conveying means, the walls of said combustion flues being composed of refractory material heatable to relatively high temperatures for effecting the burning of products of combustion supplied by said heating means, said combustion flues opening into said tunnel chamber and discharging directly thereto the gases evolved by combustion within the flues.

35. In a tunnel kiln, a tunnel chamber, burners for feeding heat and gases thereto, product-conveying means, and combustion flues unitary with said conveying means, said combustion flues being composed of refractory material and said flues ranging crosswise of the tunnel chamber for receiving the flame and products of combustion directly from said burners, said combustion flues discharging to the tunnel chamber the gases evolved by combustion within said flues.

36. In a tunnel kiln, a tunnel chamber, heating means therefor, product conveying cars movable within said chamber, and combustion flues composed of refractory material heatable to relatively high temperatures and operable for burning the products of combustion from said heating means, said combustion flues being movable with said cars within said chamber and relatively to the heating means, and means for exhausting above the level of the ware present in said tunnel chamber the gases supplied thereto from said combustion flues and the fumes emanating from said ware.

37. In a tunnel kiln, a tunnel chamber, heating means therefor, product-conveying cars movable within said chamber, combustion flues unitary with the cars, said combustion flues receiving flames and gases from the heating means and said flues opening into the tunnel chamber for discharging thereinto burned gases and products of combustion, and means separate from said combustion flues and connected with the tunnel chamber for discharging the gases supplied by the combustion flues and the fumes emanating from the product present in the tunnel chamber.

38. In a tunnel kiln, a tunnel chamber, furnaces therefor, product conveying cars movable within said chamber, and combustion flues unitary with said cars and discharging directly into said tunnel chamber gases evolved by combustion in said flues, said cars and the walls of the combustion flues being composed of refractory materials heatable to relatively high temperatures for burning within the flues the products of combustion from said furnaces.

39. In a tunnel kiln, a ware conveying car including a plurality of substantially horizontal tables and a series of dividing walls positioned in parallel relation to each other and intermediate said tables for producing therewith a series of combustion flues, each table and each division wall being composed of slabs of refractory material heatable to a high temperature by combustion within said flues, and the upper of said tables affording means for the imposition of ware adapted to be heated from below by heat radiated from said table.

40. In the heat treatment of ceramic products, the process which comprises moving masses of such products within a maturing temperature and within a cooling temperature present in different areas of a tunnel chamber, exhausting from the cooling area fumes and gases attendant upon the emission of heat from the massed matured product within the cooling area, and circulating atmospheric air within the cooling area and into contact with the massed product therein.

41. In the heat treatment of ceramic products, the process which comprises moving masses of such products successively within a pre-heating atmosphere, a high heat maturing atmosphere, and a cooling atmosphere within a tunnel chamber, exhausting from the cooling atmosphere the fumes and gases evolved by the exposure of matured masses of such products to the cooling atmosphere, admitting atmospheric air to the cooling zone and pre-heating such atmospheric air by heat emitted from such cooling masses of products, and feeding the pre-heated atmospheric air to the preheating zone of said tunnel chamber.

42. In the heat treatment of ceramic products, the process which comprises moving such products successively within a pre-heating atmosphere, a maturing temperature, and a cooling atmosphere present within definite zones of a tunnel chamber, exhausting from the upper portion of the cooling zone the fumes and gases evolved by the exposure of the matured products to the cooling atmosphere, admitting atmospheric air to the cooling zone and pre-heating such admitted air by heat emitted from the products exposed to the cooling atmosphere, exhausting the pre-heated atmospheric air from the cooling zone without dilution of such atmospheric air by the fumes and gases in the cooling zone, and feeding such pre-heated atmospheric air into the preheating zone of said tunnel chamber.

43. In the heat treatment of ceramic products, the process which comprises, moving such products successively within a preheating atmosphere and a maturing atmosphere present within definite zones of a tunnel chamber, transferring heat to the preheating zone and feeding preheated air to said preheating zone for progressively increasing the temperature of the preheating zone, and exposing unfired products to the preheating atmosphere for progressively preheating such unfired products to attain the maturing temperature as such products are moved toward the maturing atmosphere.

44. In the heat treatment of ceramic products, the process which comprises moving such products successively within a preheating atmosphere and a maturing atmosphere present within definite zones of a tunnel chamber, and pre-heating unfired products to progressively increasing temperatures during the period required for the transportation of such products within the preheating zone and finally increasing the temperature of such unfired products to substantially the maturing atmosphere prior to the movement of such products into the maturing atmosphere prevailing within the maturing zone of the tunnel chamber.

45. In the heat treatment of ceramic products, the process which comprises pre-heating a mass of unfired molded products to a maturing temperature during the period of moving such mass within a pre-heating atmosphere and prior to the entry of the resulting pre-heated products into a maturing temperature.

46. In the heat treatment of ceramic products, the process which comprises preheating a mass of unfired products to progressively increasing temperatures and until such products attain finally a maturing temperature, and moving such mass of unfired products at the pre-heating stage thereof toward and into the maturing temperature.

47. In a tunnel kiln, a bottomless tunnel chamber substantially free from sealing means and including a heating section the under part of which is open to the inflow of atmospheric air, and a kiln supporting structure above which is elevated the bottomless tunnel chamber.

48. In a tunnel kiln, a kiln-supporting structure, and a bottomless tunnel chamber supported in an elevated position by said kiln-supporting structure, said tunnel chamber being open for substantially its length for the free inflow of air.

49. In a tunnel kiln, a kiln structure substantially elevated above the level of a floor and presenting an under space for the radiation of heat and for the unobstructed inflow of atmospheric air, said kiln structure including a bottomless tunnel chamber open at the underside thereof.

50. In a tunnel kiln, an elevated kiln structure presenting an open space beneath it for the radiation of heat and for the free circulation of atmospheric air, said tunnel kiln including a tunnel chamber open at the underside for substantially the length of the kiln structure and said open under side of the tunnel chamber being substantially free from sealing means for ware conveying means.

51. In a tunnel kiln, a kiln-supported structure, and a kiln structure including a tunnel chamber open at the under side thereof to the inflow of air and free from sealing means for ware conveying means, said kiln structure being supported in an elevated position by said kiln-supporting structure.

52. In a tunnel kiln, a chamber comprising preheating, maturing and cooling zones, each provided through the crown thereof with venting means for providing a free exit for waste heat and gases, said maturing zone being of a larger cross sectional area than the other zones, and means for supplying heat to said preheating zone to effect a progressive heating of the product movable within said zone prior to its entry into the maturing zone.

53. In a tunnel kiln, a chamber comprising preheating, maturing and cooling zones, each provided through the crown thereof with venting means to provide for the free exit of waste heat and gases, the crown of the preheating zone being provided with a plurality of depending baffles to assist the venting means in discharging waste heat and gases.

54. In a tunnel kiln, a chamber comprising preheating, maturing and cooling zones, each provided through the crown thereof with venting means to provide a free exit for waste heat and gases, the crowns of the preheating and cooling zones being provided with a plurality of depending baffles to assist the venting means in discharging the waste heat and gases.

55. In a tunnel kiln, a tunnel chamber having preheating, maturing and cooling zones, product conveying means cooperable therewith, said cooling zone being provided with a vent and an exit flue through which are free to escape fumes and gases from the maturing product undergoing cooling within said zone, means for admitting atmospheric air to said cooling zone portion of the said tunnel chamber for cooling the bottom portions of said product conveying means, the atmospheric air being thereby heated and permitted to enter said cooling zone.

In testimony whereof we have signed this specification this 23rd day of February, 1927.

THEODORE C. PROUTY.
WILLIS OSWALD PROUTY.

CERTIFICATE OF CORRECTION.

Patent No. 1,862,548.

June 14, 1932.

THEODORE C. PROUTY ET AL.

It is hereby certified that error appears in the printed specification of the above numbered patent requiring correction as follows: Page 10, line 44, claim 6, for the misspelled word "enry" read entry; page 11, line 39, claim 16, after "air" insert the word admitted; and that the said Letters Patent should be read with these corrections therein that the same may conform to the record of the case in the Patent Office.

Signed and sealed this 6th day of September, A. D. 1932.

(Seal)

M. J. Moore,
Acting Commissioner of Patents.